United States Patent
Kopylovitz

(10) Patent No.: US 8,495,295 B2
(45) Date of Patent: Jul. 23, 2013

(54) MASS STORAGE SYSTEM AND METHOD OF OPERATING THEREOF

(75) Inventor: Haim Kopylovitz, Herzliya (IL)

(73) Assignee: Infinidat Ltd., Herzliya Pituach (IL)

( * ) Notice: Subject to any disclaimer, the term of this patent is extended or adjusted under 35 U.S.C. 154(b) by 554 days.

(21) Appl. No.: 12/776,708

(22) Filed: May 10, 2010

(65) Prior Publication Data

US 2010/0287408 A1    Nov. 11, 2010

Related U.S. Application Data

(60) Provisional application No. 61/176,914, filed on May 10, 2009.

(51) Int. Cl.
*G06F 12/02* (2006.01)
*G06F 11/20* (2006.01)

(52) U.S. Cl.
USPC ............................ 711/114; 711/173; 714/6.12

(58) Field of Classification Search
None
See application file for complete search history.

(56) References Cited

U.S. PATENT DOCUMENTS

| | | | | |
|---|---|---|---|---|
| 6,571,354 B1 * | 5/2003 | Parks et al. | | 714/6.32 |
| 6,578,068 B1 | 6/2003 | Bowman-Amuah | | |
| 6,886,074 B1 | 4/2005 | Narayanaswamy et al. | | |
| 6,934,804 B2 * | 8/2005 | Hashemi | | 711/114 |
| 7,743,284 B1 * | 6/2010 | Taylor et al. | | 714/42 |
| 8,122,287 B2 * | 2/2012 | D'Souza et al. | | 714/6.3 |
| 2002/0124137 A1 | 9/2002 | Ulrich et al. | | |
| 2003/0028720 A1 | 2/2003 | Lam et al. | | |
| 2003/0088803 A1 * | 5/2003 | Arnott et al. | | 714/5 |
| 2004/0103246 A1 | 5/2004 | Chatterjee et al. | | |
| 2005/0015554 A1 | 1/2005 | Zohar et al. | | |
| 2005/0086557 A1 * | 4/2005 | Sato et al. | | 714/6 |
| 2005/0216591 A1 | 9/2005 | Sato | | |
| 2006/0069866 A1 * | 3/2006 | Miyazaki | | 711/114 |
| 2006/0253674 A1 | 11/2006 | Zohar et al. | | |
| 2007/0067665 A1 * | 3/2007 | Hashemi | | 714/6 |
| 2008/0244309 A1 * | 10/2008 | Fukuyama | | 714/6 |
| 2009/0172468 A1 * | 7/2009 | Abali et al. | | 714/7 |
| 2010/0332749 A1 * | 12/2010 | Benhase et al. | | 711/114 |

* cited by examiner

*Primary Examiner* — Kaushikkumar Patel
(74) *Attorney, Agent, or Firm* — Wiggin and Dana LLP; Gregory S. Rosenblatt

(57) ABSTRACT

There are provided a mass storage system and a method of operating thereof. The method comprises: a) dividing the storage space into a first portion configured to be available to a client and a second portion configured to be unavailable to a client, thus giving rise, respectively to an available storage space and a spare storage space; b) distributing the available space and the spare space over the disk drives thus giving rise to available space and spare space allocated to each given disk drive; c) detecting underperformance of at least one disk drive among the plurality of disk drives; d) responsive to detecting underperformance, decreasing respective available space allocated to said at least one underperforming disk drive and respectively increasing spare space allocated to said at least one underperforming disk drive thus giving rise to a re-configured allocation of the available space; and e) transferring the stored data in accordance with said re-configured allocation of the available space.

23 Claims, 4 Drawing Sheets

MASS STORAGE SYSTEM AND METHOD OF OPERATING THEREOF

CROSS-REFERENCES TO RELATED APPLICATIONS

This application relates to and claims priority from U.S. Provisional Patent Application No. 61/176,914 filed on May 10, 2009 incorporated herein by reference in its entirety.

FIELD OF THE INVENTION

The present invention relates generally to mass data storage systems and, particularly, to management of storage resources thereof.

BACKGROUND OF THE INVENTION

IT organizations face a challenge in managing complex storage environments with optimal performance. Load balancing is one of the known approaches helping to maintain high performance operating. Load balancing techniques enable distribution of workload across different resources in order to get improved resource utilization. The problems of implementing load balancing techniques in mass data storage systems have been recognized in the Prior Art and various systems have been developed to provide a solution as, for example:

U.S. Pat. No. 6,578,068 (Bowman-Amuah) discloses a method for distributing incoming requests to a storage system. The requests are received and stored by an activity module, which instructs a client to handle a first subset of the requests and passes a second subset of the requests on to a load balancer. The load balancer sends particular requests of the second subset to a server component determined to be most appropriate to receive the request.

U.S. Pat. No. 6,886,074 (Narayanaswamy et al.) discloses a method for load balancing a redundant array of inexpensive disks (RAID). Data is stored on two drives, and counters of read commands for the drives are maintained. A new read command is directed to the drive having the lowest counter.

U.S. patent application Ser. No. 2002/124137 (Ulrich) discloses a system and method for enhancing disk array performance via variable-parity-based load balancing. The system and method operate on a computer storage system that includes a plurality of disk drives for storing distributed parity groups. Each distributed parity group includes storage blocks. The storage blocks include one or more data blocks and a parity block that is associated with the one or more data blocks. Each of the storage blocks is stored on a separate disk drive such that no two storage blocks from a given parity set reside on the same disk drive. The computer storage system further includes file system metadata to describe a location of each of the storage blocks. The computer storage system further includes a load-balancing module to dynamically move storage blocks of the distributed parity groups among the plurality of disk drives to balance transaction loading of the plurality of disk drives and thereby to improve throughput of the computer storage system. The load-balancing module is configured to update the file system metadata when a storage block is moved.

U.S. patent application Ser. No. 2003/028720 (Lam) discloses load balancing of activities on physical disk storage devices accomplished by monitoring reading and writing operations to blocks of contiguous storage locations on the physical disk storage devices. Statistics accumulated over an interval are then used to obtain access activity values for each block and each physical disk drive.

U.S. patent application Ser. No. 2004/103246 (Chatterjee et al.) discloses a system and method for increased data availability. The method includes receiving a SMART indication from a data storage device included in a plurality of data storage devices configured as a RAID array. Data from the data storage device which originated the SMART indication is replicated to a second data storage device which was not originally configured in the RAID array. The data storage device which originated the SMART indication from the RAID array is removed, thereby resulting in the second data storage device and the plurality of data storage devices configured as a RAID array.

U.S. patent application Ser. No. 2005/216591 (Sato) discloses managing storage resources in comprising a plurality of storage subsystems with different processing performance, wherein volumes are automatically relocated according to the state of use of each storage subsystem.

U.S. patent application Ser. No. 2005/0015554 (Zohar et al.) discloses a data storage system having a number of caches. If one of the caches of the system is unable to retrieve data from or store data at a range of logical addresses, one or more other caches are reconfigured to retrieve data from and store at the range while continuing to retrieve data from and store at other ranges of logical addresses.

U.S. patent application Ser. No. 2006/0253674 (Zohar et al.) discloses a method for operating a data storage system including a first and one or more second mass storage devices. Upon detecting an unacceptable level of activity on the first mass storage device, The data stored in the first mass storage device is transferred to the second mass storage devices, reformats the first mass storage device and, after reformatting the first mass storage device, transfers the data stored in the second mass storage devices to the first mass storage device.

SUMMARY OF THE INVENTION

In accordance with one aspect of the subject matter of the present application, there is provided a method of operating a mass storage system comprising a storage layer operatively coupled to a plurality of disk drives constituting a storage space, the system configured to enable direct or indirect serving a request directed to any accessible address in the storage space. The method comprises: a) dividing the storage space into a first portion configured to be available to a client and a second portion configured to be unavailable to a client, thus giving rise, respectively to an available storage space and a spare storage space; b) distributing the available space and the spare space over the disk drives thus giving rise to available space and spare space allocated to each given disk drive; c) detecting underperformance of at least one disk drive among the plurality of disk drives; d) responsive to detecting underperformance, decreasing respective available space allocated to said at least one underperforming disk drive and respectively increasing spare space allocated to said at least one underperforming disk drive thus giving rise to a re-configured allocation of the available space; and e) transferring the stored data in accordance with said re-configured allocation of the available space.

In accordance with other aspect of the subject matter of the present application, there is provided a mass storage system comprising a plurality of disk drives constituting a storage space, wherein i) the system configured to enable direct or indirect serving a request directed to any accessible address in the storage space; ii) the storage space is divided into a first portion configured to be available to a client and a second portion configured to be unavailable to a client, thus giving rise, respectively to an available storage space and a spare storage space; iii) the available space and the spare space are distributed over the disk drives thus giving rise to available space and spare space allocated to each given disk drive. The system further comprises means for detecting underperformance of at least one disk drive among the plurality of disk drives and a control layer operatively coupled to the plurality of disk drives. The control layer configured: i) responsive to detecting underperformance, to decrease respective available space allocated to said at least one underperforming disk drive and respectively increase spare space allocated to said at least one underperforming disk drive thus giving rise to a re-configured allocation of the available space; and ii) facilitate transferring the stored data in accordance with said re-configured allocation of the available space. Optionally, at least part of said means for detecting underperformance of disk drives may be comprised in said control layer.

In accordance with further aspects of the subject matter of the present application, the remainder of the available space (said remainder resulting from said re-configured allocation of the available space over at least some of due performing disks drives) may be distributed among the plurality of disk drives and the spare space allocated to said drives may be respectively decreased. Optionally, distributing the available space and the spare space over the disk drives may be provided evenly. Alternatively or additionally, distributing the remainder of the available space over at least part of the due performing disks and respectively decreasing the spare space allocated to said drives may be provided evenly.

In accordance with further aspects of the subject matter of the present application, the amount of increased spare space allocated to said at least one underperforming disk drive may be predefined as a certain percentage of respective allocated spare space. Alternatively or additionally, the amount of increased spare space allocated to said at least one underperforming disk drive may be predefined as a function of at least one parameter selected from a group comprising: a number of currently underperforming disk drives among the plurality of disk drives; a number of underperforming disk drives among the plurality of disk drives detected during a certain period of time; a rate of deviation of the detected level of underperformance from the current average performance of the plurality of the disk drives; and a rate of deviation of the detected level of underperformance from the average performance of the plurality of the disk drives in the system over a certain period of time.

In accordance with further aspects of the subject matter of the present application, the stored data portions may be arranged in one or more RAID groups with the help of an allocation function and transferring the stored data portions may comprise: a) re-calculating the values of the allocation function in accordance with said re-configured allocation of available space over the disk drives; b) detecting members of RAID groups which need to be moved in accordance with the re-calculated values of the allocation function; and c) moving data corresponding to said detected members of RAID groups in accordance with the re-calculated values of the allocation function.

In accordance with further aspects of the subject matter of the present application detecting underperformance of at least one disk drive is provided with the help of SMART indication.

In accordance with further aspects of the subject matter of the present application, detecting underperformance may include estimating a value characterizing expected performance degradation and detecting a match of this value to a certain underperformance criteria. READ ERROR RATE and/or SEEK ERROR RATE may be used as parameters indicative of expected performance degradation for SMART-enabled disk drives. Value characterizing expected performance degradation may be estimated with the help of a rate of variation of values of READ ERROR RATE and/or SEEK ERROR RATE. Optionally, said rate of variation may be calculated in relation with a certain rate measuring threshold. READ ERROR RATE and/or SEEK ERROR RATE values may achieve rate measuring thresholds used for estimating expected performance degradation substantially before achieving respective thresholds predefined for alerting an expected failure of SMART-enabled disk drives.

Among advantages of certain embodiments of the present invention is facilitating load balancing and, thus, improving utilization of storage resources responsive to uneven degradation of different disk drives' performance.

I. BRIEF DESCRIPTION OF THE DRAWINGS

In order to understand the invention and to see how it may be carried out in practice, embodiments will now be described, by way of non-limiting example only, with reference to the accompanying drawings, in which.

II. DETAILED DESCRIPTION OF EMBODIMENTS

Figure 1:
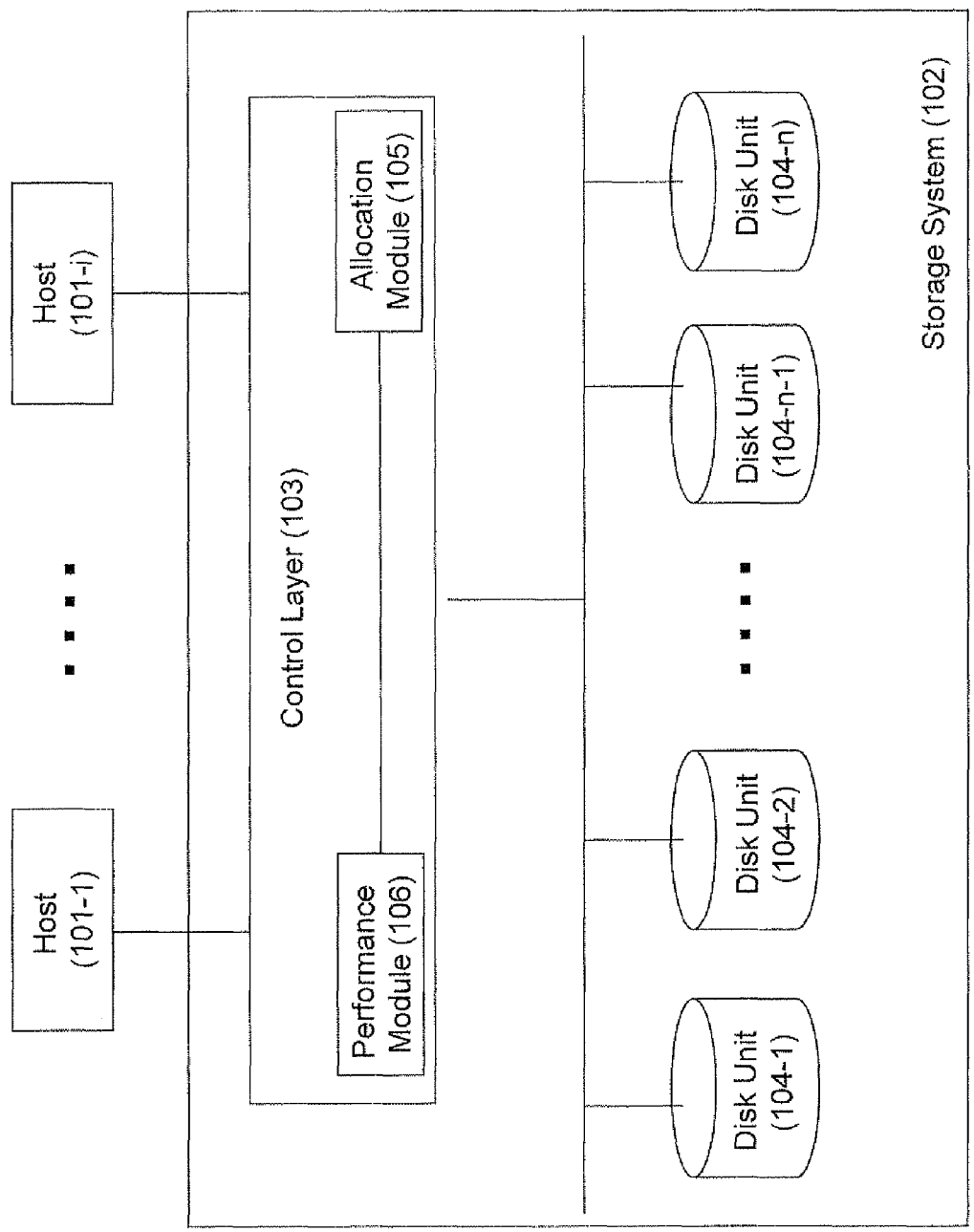
FIG. 1 illustrates a generalized functional block diagram of a mass storage system in accordance with certain embodiments of the present invention.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "modifying", "calculating", "determining", "generating", "configuring", "allocating", "estimating" or the like, refer to the action and/or processes of a computer that manipulate and/or transform data into other data, said data represented as physical, such as electronic, quantities and/or represent one or more physical objects. The term "computer" should be expansively construed to cover any kind of electronic device with data processing capabilities, including, by way of non-limiting example, storage system disclosed in the present applications.

The operations in accordance with the teachings herein may be performed by a computer specially constructed for the desired purposes or by a general purpose computer specially configured for the desired purpose by a computer program stored in a computer readable storage medium.

The references cited in the background teach many principles of managing resources of mass storage systems that are applicable to the present invention. Therefore the full contents of these publications are incorporated by reference herein where appropriate for appropriate teachings of additional or alternative details, features and/or technical background.

In the drawings and descriptions, identical reference numerals indicate those components that are common to different embodiments or configurations.

Bearing this in mind, attention is drawn to FIG. 1 illustrating a schematic functional diagram of a mass storage system in accordance with certain embodiments of the present invention.

The illustrated mass storage system 102 provides common storage means to be shared by a plurality of host computers (illustrated as 101-1-101-n). The storage system comprises a control layer 103 comprising a plurality of appropriate storage control devices operatively coupled to the plurality of host computers and operable to control I/O operations between the plurality of host computers and a plurality of data storage devices. The storage devices constitute a physical storage space optionally distributed over one or more storage nodes, wherein the storage control layer is operable to control interface operations (including I/O operations) between the host computers and the storage physical space. The storage system is configured in a manner enabling direct or indirect serving a request directed at any available address in the physical storage space.

Optionally, the storage control layer may be further operable to handle a virtual representation of physical storage space, and to facilitate necessary mapping between the physical storage space and its virtual representation. The virtualization functions may be provided in hardware, software, firmware or any suitable combination thereof. Optionally, the functions of the control layer may be fully or partly integrated with one or more host computers and/or storage devices and/or with one or more communication devices enabling communication between the hosts and the storage devices. The storage control layer and the storage devices may communicate with the host computers and within the storage system in accordance with any appropriate storage protocol.

The physical storage space may comprise any appropriate permanent storage medium and include, by way of non-limiting example, a plurality of physical disk drives (PD) organized in one or more arrays (illustrated as disk units 104-1-104-n). Typically the number of physical disk drives is equal for all disk units (DUs) and at least as large as necessary for adequately implementing a chosen protection scheme. The physical storage space comprises a plurality of data blocks, each data block being characterized by a pair ($DD_{id}$, DBA), and where $DD_{id}$ is a serial number associated with the physical disk drive accommodating the data block, and DBA is a logical block number within the respective disk. By way of non-limiting example, $DD_{id}$ may represent a serial number internally assigned to the physical disk drive by the system or, alternatively, a WWN or universal serial number assigned to the disk drive by a vendor.

Stored data may be logically represented to a client in terms of logical objects. Depending on storage protocol, the logical objects may be logical volumes, data files, multimedia files, snapshots and other copies, etc. For purpose of illustration only, the following description is provided with respect to logical objects represented by logical volumes. Those skilled in the art will readily appreciate that the teachings of the present invention are applicable in a similar manner to other logical objects.

A logical volume (LU) is a virtual entity logically presented to a client as a single virtual storage device. The logical volume represents a plurality of data blocks characterized by successive Logical Block Addresses (LBA) ranging from 0 to a number LUK. Different LUs may comprise different numbers of data blocks, while the data blocks are typically of equal size (e.g. 512 bytes). Blocks with successive LBAs may be grouped into data portions that act as basic units for data handling and organization within the system.

Successive data portions constituting a logical volume are typically stored in different physical disk drives (e.g. for purposes of both performance and data protection), and to the extent that it is possible, across different DUs. Typically, definition of LUs in the storage system involves in-advance configuring an allocation scheme used to determine the location of the various data portions and their associated parity portions across the physical storage medium. Logical contiguity of successive portions and physical contiguity of the storage location allocated to the portions in the system are not necessarily correlated. The allocation scheme may be handled/updated in an allocation module (105) being a part of the storage control layer. The allocation module may be implemented as a centralized module operatively connected to the plurality of storage control devices or may be, at least partly, distributed over some or all storage control devices.

When receiving a write request from a host, the storage control layer defines a physical location(s) designated for writing the respective data (e.g. in accordance with an allocation scheme and/or preconfigured rules and policies stored in the allocation module or otherwise). Similarly, when receiving a read request from the host, the storage control layer defines the physical location(s) of the desired data portion(s) and further processes the request accordingly. The storage control layer further issues updates of a given data object to all storage nodes which physically store data related to the data object. The storage control layer is further operable to redirect the request/update to storage device(s) with appropriate storage location(s) irrespective of the specific storage control device receiving I/O request.

In accordance with certain embodiments of the present invention, the control layer further comprises a performance module 106 operatively connected with the allocation module and operable to facilitate operations further detailed with reference to FIG. 4. The performance module may be implemented as a centralized module operatively connected to the plurality of storage control devices or may be, at least partly, distributed over some or all storage control devices.

The storage system may be further configured to facilitate various protection schemes as will be further detailed with reference to FIGS. 2-3. By way of non-limiting example, data storage formats, such as RAID (Redundant Array of Independent Discs), may be employed to protect data from internal component failures by making copies of data and rebuilding lost or damaged data. As the likelihood for two concurrent failures increases with the growth of disk array sizes and increasing disk densities, data protection may be implemented, by way of non-limiting example, with the RAID 6 data protection scheme well known in the art.

Certain embodiments of the present invention are applicable to the architecture of the storage system described with reference to FIG. 1. However, the invention is not bound by the specific architecture, equivalent and/or modified functionality may be consolidated or divided in another manner and may be implemented in any appropriate combination of software, firmware and hardware. Those versed in the art will readily appreciate that the subject matters of the present application are, likewise, applicable to any mass storage architecture configured to enable direct or indirect serving a request directed at any accessible address in the storage space. In different embodiments of the invention the functional blocks and/or parts thereof may be placed in a single or in multiple geographical locations (including duplication for high-availability); operative connections between the blocks and/or within the blocks may be implemented directly (e.g. via a bus) or indirectly, including remote connection. The remote connection may be provided via Wire-line, Wireless, cable, Internet, Intranet, power, satellite or other networks and/or using any appropriate communication standard, system and/or protocol and variants or evolution thereof (as, by way of unlimited example, Ethernet, iSCSI, Fiber Channel, etc.).

Figure 2:
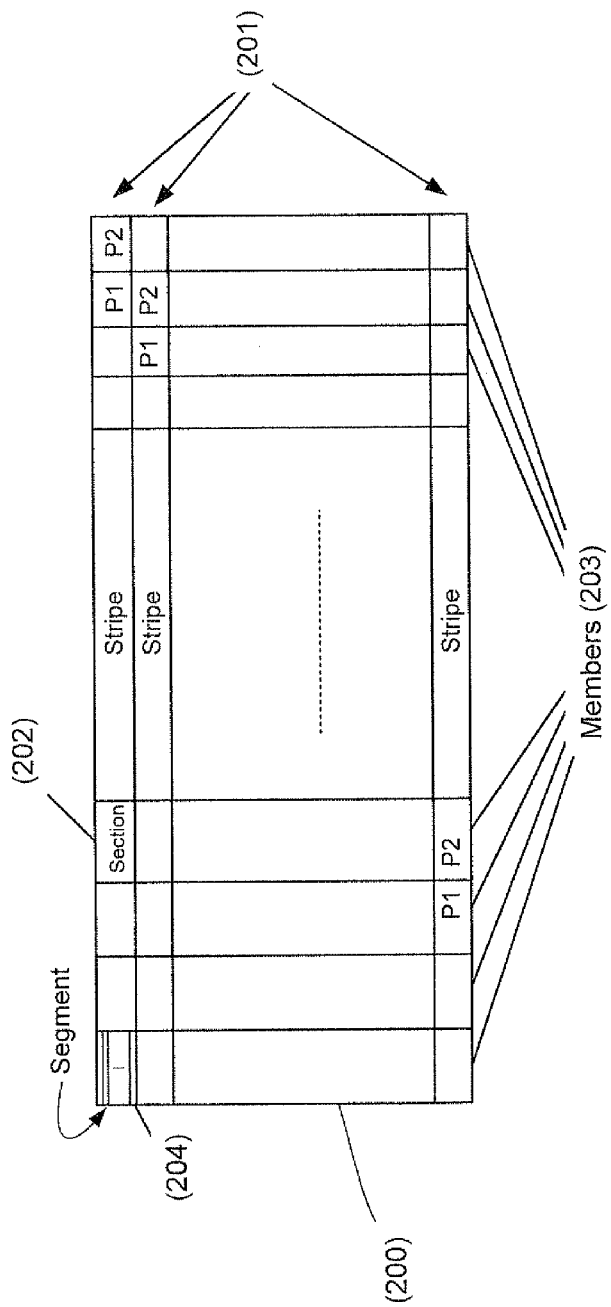
FIG. 2 illustrates a schematic diagram of physical storage space configured in RAID group as known in the art.

Referring to FIG. 2, there is illustrated a schematic diagram of the physical storage space configured in RAID groups as known in the art. For purpose of illustration only, the following description is made with respect to RAID 6 architecture. Those skilled in the art will readily appreciate that the teachings of the present invention are not bound by RAID 6 and are applicable in a similar manner to other RAID technology in a variety of implementations and form factors.

Common to all RAID 6 protection schemes is the use of two parity data portions per several data groups (e.g. using groups of four data portions plus two parity portions in (4+2) protection scheme), the two parities being typically calculated by two different methods. Under one known approach, all N consecutive data portions are gathered to form a RAID group, to which two parity portions are associated. The data portions in the RAID group as well as their parity portions are typically stored in separate physical disk drives. Under a second known approach, protection groups may be arranged as two-dimensional arrays, such that data portions in a given line or column of the array are stored in separate disk drives. In addition, to every row and to every column of the array a parity data portion may be associated. These parity portions are stored in such a way that the parity portion associated with a given column or row in the array resides in a physical disk drive where no other data portion of the same column or row also resides. Under both approaches, whenever data is written to a data portion in a group, the parity portions are also updated (e.g. using approaches based on XOR or Reed-Solomon algorithms). Whenever a data portion in a group becomes unavailable (e.g. because of physical disk drive general malfunction, or because of a local problem affecting the portion alone, or because of other reasons), data can still be recovered with the help of a single parity portion via appropriate, known in the art, techniques. Then, if a second malfunction causes data unavailability in the same drive before the first problem was repaired, data can nevertheless be recovered using the second parity portion and appropriate known in the art techniques.

A RAID group (200) comprises N+2 members (203), where N is number of data portions in the group and 2 members are added for 2 parity portions. In the illustrated example N=16. The typical size of a group member is 4 GB. Accordingly, the RAID group may typically comprise (4*16=) 64 GB of data. A typical size of the RAID group, including the parity blocks, may be (4*18=) 72 GB.

Data blocks may be striped across the members of the RAID group; thus constituting the RAID group 200 as a concatenation of stripes (201), each stripe being a complete (connected) set of data and parity elements that are dependently related by parity computation relations. In other words, the stripe is the unit within which the RAID write and recovery algorithms are performed in the system. A stripe comprises N+2 sections (202), the sections being the intersection of a stripe with a member (203) of the RAID group. Each section is further sub-divided into 16 segments (204). Sections and segments are used to calculate the two parity sections associated with each stripe.

Figure 3:
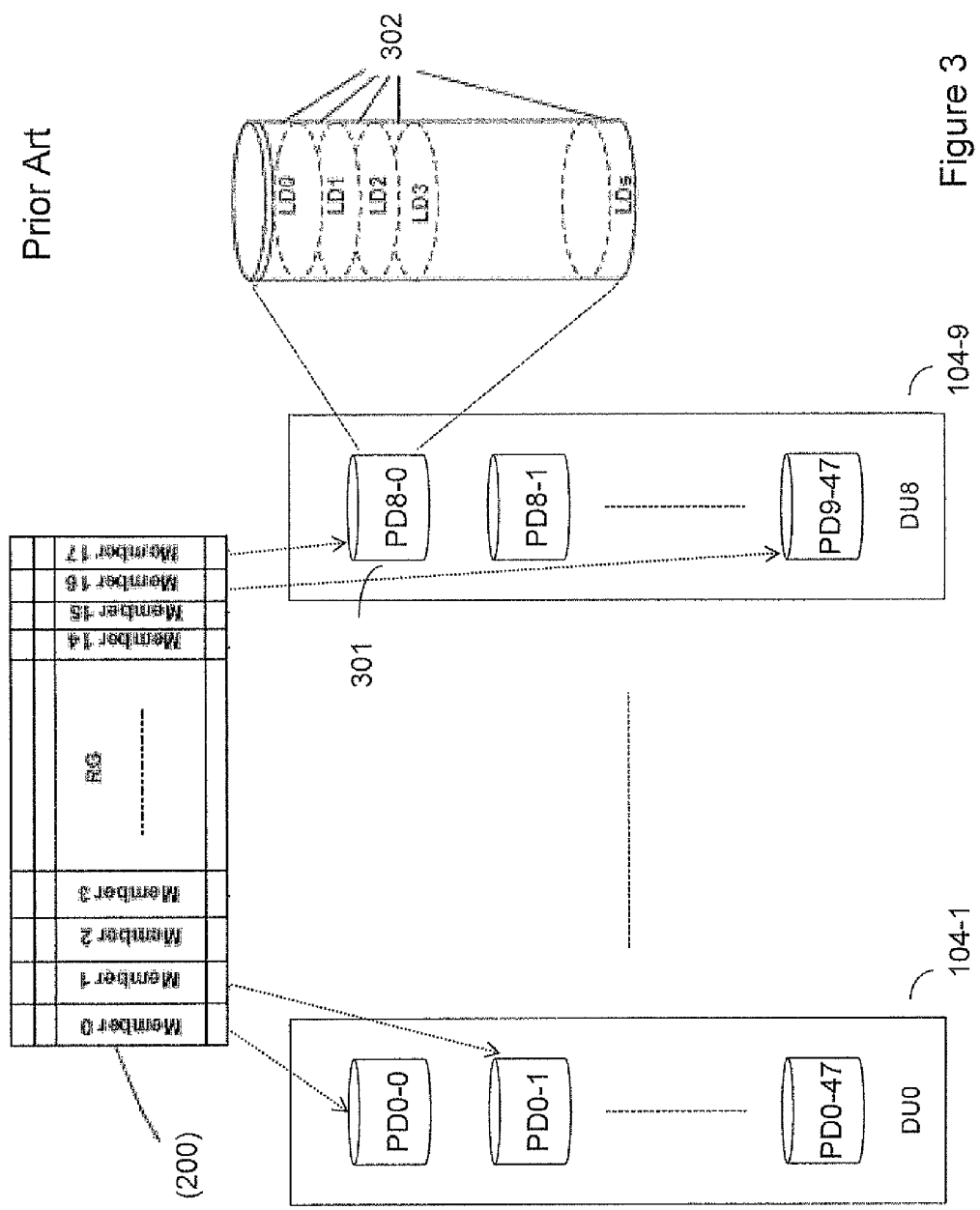
FIG. 3 illustrates a schematic diagram of allocating RAID group across disk drives as known in the art.

The storage system is configured to allocate data portions associated with the RAID group members over various physical disk drives as further illustrated in FIG. 3. In the illustrated example, the storage system comprises nine disk units (DUs) (104-1-104-9) each comprising 48 physical disk drives. The physical disk drives need not be identical. For purposes of allocation, each physical disk drive (PD) may be divided into successive logical drives (LDs) which may be all of a given size (e.g. the size of RAID group members). In the illustrated example physical disk drive 301 is divided into a plurality of logical disk drives 302. Typical PD currently in use in the industry may comprise around 250 LDs of such size.

The allocation of data portions may be provided with the help of the allocation module 105. Operation of the allocation module may be described as a function referred to hereinafter as an allocation function (AF). The inputs of the allocation function include a certain data portion DPy of volume LUx indicated in I/O request received by the storage control layer and status data comprising information related to a current and/or historical status of disk drives in the storage system 102. The output produced by the function will indicate the physical location assigned to data portion (DPy, LUx) in terms of a specific physical disk drive (and, optionally, logical disk drive) comprised in the system 102, and the initial address LBA allocated within that drive. The output may further indicate the physical location assigned to the two parity portions associated with the RAID 6 group to which this portion belongs, in terms of disk drives and initial LBA within the drive for each of the two parity portions.

The allocation function may be defined in different ways enabling necessary levels of data protection and availability. By way of non-limiting example, the allocation function may be defined in a manner that each member of the same RAID group picks a logical disk within a certain physical disk drive under least contention conditions. Thus, for instance, in the illustrated example, the eighteen members of RAID group 200 may be distributed over PDs in such a way that no more than two members are ever assigned to the same PD (by non-limiting example some of the assignments are illustrated by dashed arrows: member 0 is assigned to PD0-0 in DU0, member 1 is assigned to PD0-1 in DU0, member 16 is assigned to PD8-0 in DU8, member 17 is assigned to PD0-47 in DU8).

In accordance with known best practices, the allocation of physical storage space is defined in a manner enabling optimal utilization of the system resources. However, uneven degradation in actual performance levels of different drives may start to appear and eventually to increase with time. Such degradation derives mainly, but not exclusively, from various kinds of media problems as well as mechanical wear-out, such as disk shaking. The performance of different disk drives may be changed unevenly; for example performance differences of initially substantially identical SATA disk drives may, with time, exceed 10%. The non-even changes in performance of different disk drives may lead to significant degradation of overall system performance.

Figure 4:
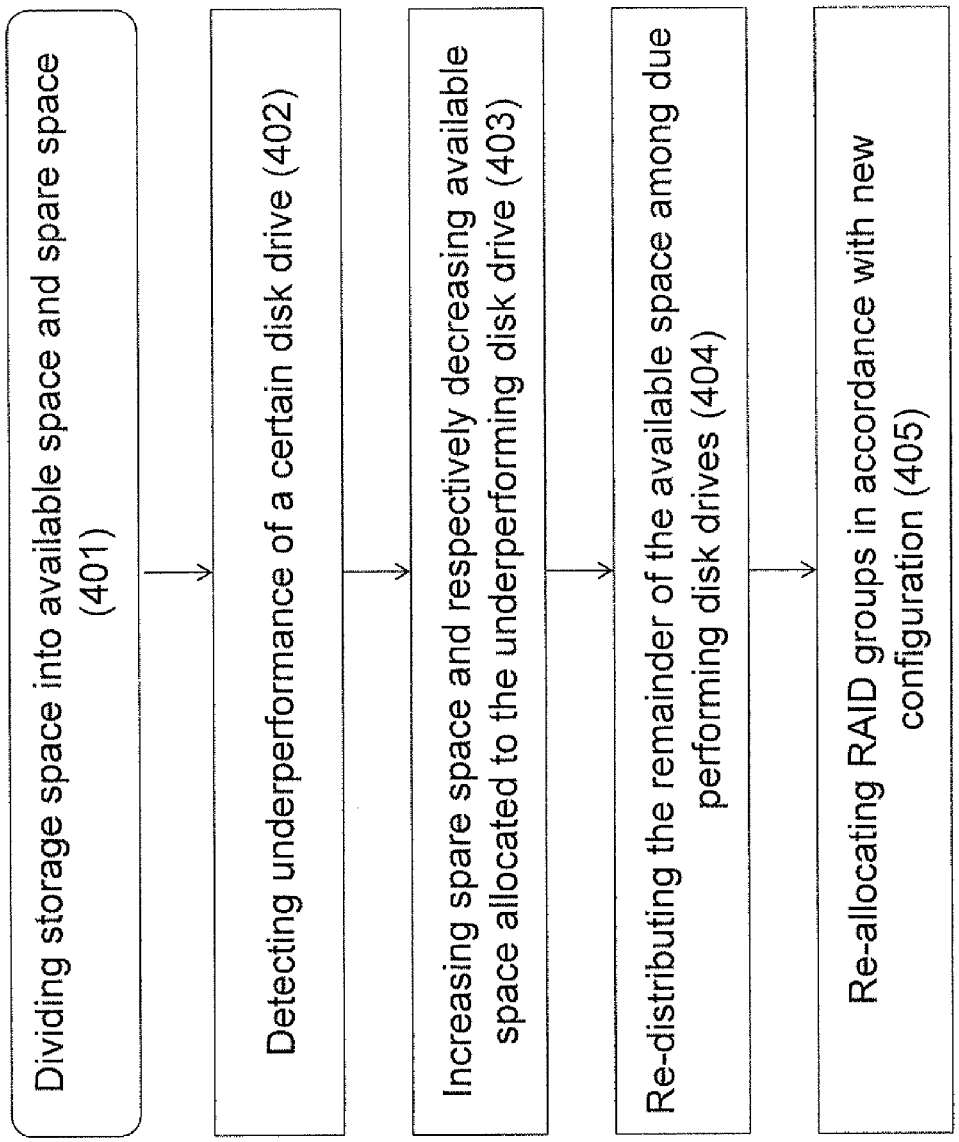
FIG. 4 illustrates a generalized flow-chart of operating the storage system in accordance with certain embodiments of the present invention.

Referring to FIG. 4, there is illustrated a generalized flow chart of operating the storage system in accordance with certain embodiments of the present invention.

The storage system 102 is configured to monitor individual performance of disk drives constituting the physical storage space. By way of non-limiting example, such monitoring may be provided by measuring parameters characterizing disk drive operation (e.g. maximal and/or average lengths of task queues on the disk controllers, and/or average and/or maximal latencies, and/or reduced rate of completion of IO read and/or write requests compared to the average rate; etc).

Some of the monitoring techniques are well known in the art and may be based on standard monitoring tools.

In accordance with certain embodiments of the present invention, the results of monitoring and/or derivatives thereof are obtained (in pull and/or push mode) by the performance module 106. The performance module is further configured to process the obtained data and to generate data indicative of performance degradation and/or expected performance degradation of respective individual disk drives. Respective data may be obtained and/or further processed continuously, periodically and/or in accordance with certain events (e.g. request by system administrator). With the help of said generated data the performance module further detects (402) when the performance degradation and/or expected performance degradation of at least one disk matches certain underperformance criteria, such performance degradation and/or expected performance degradation referred to hereinafter as "underperformance".

By way of non-limiting example, the monitoring may be provided with the help of a special technique called Self-Monitoring Analysis and Reporting Technology or SMART. SMART-enabled disks comprise integrated controllers monitoring various aspects of disks' performance and providing status information to software configured to examine the data. Among data indicative of disk drive performance degradation are READ ERROR RATE and SEEK ERROR RATE parameters available for SMART-enabled disk drives. These parameters are sensitive to transient media problems and to problems of "disk seek" commands that fail to perform precisely. Problems of this kind may be caused by mechanical reasons, such as disk trembling, and they lead to additional seeks and hence to further delays in latency.

The integrated controller monitors I/O activities of a given individual disk and provides respective normalized values, typically between 0 and 100 points, based on statistics performed on large amount of bits (e.g. in reference to the last $10^{10}$ bits addressed by I/O activity). In implementations of SMART technology as known in the art, the disk controller issues a failure alert if a value of READ ERROR RATE (indicative of recoverable read errors) and/or a value of SEEK ERROR RATE (indicative of failures to reach the correct place of the performed seek) fall below a predefined alert threshold.

In accordance with certain embodiments of the present invention, READ ERROR RATE and SEEK ERROR RATE may be used for estimation of expected performance degradation. The performance module 106 may be configured to process current and/or historical values of READ ERROR RATE and/or SEEK ERROR RATE in order to estimate expected performance degradation and to compare the results with a certain underperformance criteria. By way of non-limiting example, the performance module 106 may be configured to continuously process obtained values of READ ERROR RATE and/or SEEK ERROR RATE in order to calculate a rate of variation of respective values. A given disk may be estimated as underperforming if the calculated variation rate matches the underperformance criteria. For instance, the underperformance criteria may be defined as 5 points reduction of READ ERROR RATE and/or SEEK ERROR RATE values during a period of week.

By way of another non-limiting example, calculations of the variation rate of values of READ ERROR RATE and/or SEEK ERROR RATE may be provided in association with predefined rate measuring thresholds. For instance, the rate measuring threshold of READ ERROR RATE may be defined as 87 points, and the underperformance criteria may be defined as reduction of READ ERROR RATE from 87 to 84 points within a period of a week. Accordingly, a given disk may be estimated as underperforming if the measured values of READ ERROR RATE reduce from 87 to 84 points in less than one week period. Likewise, the rate measuring threshold of SEEK ERROR RATE may be defined as 93 points, and underperformance criteria may be defined as reduction of SEEK ERROR RATE from 93 to 89 points within a period of a week. A given disk may be estimated as underperforming if measured values of SEEK ERROR RATE reduce from 93 to 89 points in less than one week period. In accordance with certain embodiments of the present invention, READ ERROR RATE and/or SEEK ERROR RATE values may achieve respective rate measuring thresholds used for estimating expected performance degradation substantially before achieving the predefined alert threshold.

Responsive to detected underperformance, the performance module initiates a process of re-allocating RAID groups across the disk drives, such a process being referred to hereinafter as a re-allocation process. Such initiating may comprise any actions or combination thereof necessary for commencing the re-allocation process (e.g. informing the appropriate element(s) in the control layer about matching the certain degradation criteria, and/or requesting the appropriate element(s) in the control layer for starting the re-allocation process, and/or providing approval for starting the re-allocation process, etc.).

Physical storage space of the storage system 102 is divided (401) into two parts—a first part configured as available for a client (and referred to hereinafter as "available space") and a second part configured as non-available for a client (and referred to hereinafter as a "spare space"). Configuring the physical storage space with inherent spare space is known in the art, this spare space in a case of necessity may be used by various recovery and self-healing mechanisms. For example, when one of the disks in the storage system fails, the spare space of other disks may be used in order to restore full protection to the data stored in the system.

Initially the spare space may be distributed between disk drives in a different manner. By way of non-limiting example, the various disk drives in the storage system may be assumed to be similar in their physical properties, and, thus, may be assumed to perform substantially evenly; the spare space may be allocated as evenly distributed across the disk drives. By way of alternative non-limiting example, the storage system may comprise disk drives having substantially different initial performance, and the spare space may be allocated in proportion to the initial performance of the disk drives. Those skilled in the art will readily appreciate that the teachings of the present invention are not bound by the scheme of initial allocation of the spare space.

The re-allocation process starts from re-configuring the available space and the spare space initially allocated in the system. The reconfiguring is provided as following:
 a) increasing the spare space and respectively decreasing the available space allocated for the underperforming disk drive (403), thus giving rise to a remainder of available space;
 b) distributing the remainder of the available space among at least part of due performing disk drives (404).

The amount of increased spare space of an underperforming disk drive may be configured in accordance with predefined rules; such rules may be stored in the performance module 106 or otherwise. By way of non-limiting example, the amount of increased spare space may be predefined in terms of percentage of the existing spare space (e.g. 1%) Alternatively or additionally, the amount may depend on detected level of underperformance; and/or number of currently underperforming drives in the storage system and/or detected in the storage system during a certain period of time; and/or a rate of deviation of the detected level of underperformance from the current average performance of the disk drives in the storage system (e.g. the greater the deviation, the greater the reduction); and/or a rate of deviation of the detected level of underperformance from the average in the system over a certain period of time; etc.

Distributing the remainder of available space may be provided in various ways. For example, in a case where spare space has been evenly initially allocated across the disk drives, the remainder of the available space may be also evenly distributed across all due performing disk drives (or across a certain part thereof). If a disk drive $PD_r$ in Disk Unit $DU_q$ is detected as underperforming, the size of the spare space allocated to this disk drive (further designated as $SP(PD_r, DU_q)$) is increased, in accordance to predefined rules, to the size $SP1(PD_r, DU_q)$. The spare space allocated to due performing disk drives is decreased, and available space is respectively increased, by an amount which is equal to the difference SP1(PDr,DUq)−SP(PDr,DUq). This difference may be evenly divided between all due performing disk drives. Alternatively, the remainder of the available space (equal to the difference SP1(PDr,DUq)−SP(PDr,DUq)) may be evenly distributed across only a certain portion of the entire plurality of disks drives and/or or across only certain disk units, etc. Alternatively, the spare space allocated for the underperforming disk drive may be increased and, respectively, the available space may be decreased without re-distributing the remainder of available space. By way of another non-limiting example, in a case of disk drives having substantially different initial performance, the remainder of available space (and respective decrease of spare space) may be distributed in accordance with respective initial performance.

The process of re-allocating RAID groups across the disk drives further includes transferring the stored data portions in accordance with new, re-configured, allocation of available space through over the disk drives. Such transferring may comprise the following operations:

re-calculating (e.g. by the allocating module) the values of allocation function in accordance with re-configured allocation of available space across the disk drives;

detecting (e.g. by the control layer) which members of RAID groups need to be moved in accordance with the re-calculated values of the allocation function;

moving (e.g. by the control layer) data portions corresponding to the detected members of RAID groups in accordance with the re-calculated values of the allocation function.

Resulting from the above re-allocation process, the underperforming disk contains less available space. Accordingly, less IO activity is directed to such disks thus enabling optimization of workload distribution in the storage system responsive to uneven degradation of disks' performance.

It will be appreciated that the embodiments described above are cited by way of example, and various features thereof and combinations of these features can be varied and modified.

The invention claimed is:

1. A method of operating a mass storage system comprising a storage layer operatively coupled to a plurality of disk drives constituting a storage space, the system configured to enable direct or indirect serving a request directed to any accessible address in the storage space, the method comprising:

a. dividing the storage space into an available storage space configured to be available to a client and a spare storage space configured to be unavailable to a client;

b. distributing the available space and the spare space over the plurality of disk drives thus giving rise to available space and spare space allocated to each given disk drive;

c. detecting underperformance of at least one disk drive among the plurality of disk drives;

d. responsive to detecting underperformance, decreasing respective available space allocated to said at least one underperforming disk drive and respectively increasing spare space allocated to said at least one underperforming disk drive thus giving rise to a re-configured allocation of the available space; wherein the amount of increased spare space allocated to said at least one underperforming disk drive is predefined as a certain percentage of respective allocated spare space; and e. transferring the stored data in accordance with said re-configured allocation of the available space.

2. The method of claim 1 further comprising distributing a remainder of the available space resulting from said re-configured allocation of the available space over at least some of due performing disk drives among the plurality of disk drives and respectively decreasing the spare space allocated to the at least some of due performing disk drives.

3. The method of claim 1 wherein distributing the available space and the spare space over the plurality of disk drives is provided evenly.

4. The method of claim 3 wherein distributing said remainder of the available space over at least part of the due performing disk drives and respectively decreasing the spare space allocated to the at least some of due performing disk drives are provided evenly.

5. The method of claim 1 wherein the stored data portions are arranged in one or more RAID groups with the help of an allocation function and wherein transferring the stored data portions comprises:

a. re-calculating the values of the allocation function in accordance with said re-configured allocation of available space over the disk drives;

b. detecting members of RAID groups which need to be moved in accordance with the re-calculated values of the allocation function; and c. moving data corresponding to said detected members of RAID groups in accordance with the re-calculated values of the allocation function.

6. The method of claim 1 wherein detecting underperformance of at least one disk drive is provided with the help of SMART indication.

7. The method of claim 1 wherein underperformance is detected if an estimated value characterizing expected performance degradation matches a certain underperformance criteria.

8. The method of claim 7 wherein READ ERROR RATE and/or SEEK ERROR RATE are used as parameters indicative of expected performance degradation for SMART-enabled disk drives.

9. The method of claim 8 wherein a rate of variation of values of READ ERROR RATE and/or SEEK ERROR RATE is used as said estimated value characterizing expected performance degradation.

10. The method of claim 9 wherein said rate of variation is calculated in relation with a certain rate measuring threshold.

11. The method of claim 10 wherein READ ERROR RATE values and/or SEEK ERROR RATE values respective rate measuring thresholds used for estimating expected performance degradation substantially before achieving a threshold predefined for alerting an expected failure of SMART-enabled disk drive.

12. A mass storage system comprising:
   a. a plurality of disk drives constituting a storage space, wherein:
      i. the system configured to enable direct or indirect serving a request directed to any accessible address in the storage space;
      ii. the storage space is divided into an available storage space configured to be available to a client and a spare storage space configured to be unavailable to a client;
      iii. the available space and the spare space are distributed over the plurality of disk drives thus giving rise to available space and spare space allocated to each given disk drive;
   b. means for detecting underperformance of at least one disk drive among the plurality of disk drives;
   c. a control layer operatively coupled to the plurality of disk drives and configured:
      i. responsive to detecting underperformance, to decrease respective available space allocated to said at least one underperforming disk drive and respectively increase spare space allocated to said at least one underperforming disk drive thus giving rise to a re-configured allocation of the available space; wherein the amount of increased spare space allocated to said at least one underperforming disk drive is predefined as a certain percentage of respective allocated spare space; and
      ii. facilitate transferring the stored data in accordance with said re-configured allocation of the available space.

13. The system of claim 12 wherein the control layer is further configured to distribute a remainder of the available space resulting from said re-configured allocation of the available space over at least some of due performing disks drives among the plurality of disk drives and respectively decrease the spare space allocated to the at least some of due performing disk drives.

14. The system of claim 12 wherein distributing the available space and the spare space over the disk drives, distributing said remainder of the available space over at least part of the due performing disks and respectively decreasing the spare space allocated to said drives are provided evenly.

15. The system of claim 12 wherein the stored data portions are arranged in one or more RAID groups with the help of an allocation function and wherein transferring the stored data portions comprises:
   a. re-calculating the values of the allocation function in accordance with said re-configured allocation of available space over the disk drives;
   b. detecting members of RAID groups which need to be moved in accordance with the re-calculated values of the allocation function; and
   c. moving data corresponding to said detected members of RAID groups in accordance with the re-calculated values of the allocation function.

16. The system of claim 12 wherein said means for detecting underperformance of disk drives comprise one or more SMART controllers integrated with individual disk drives among said plurality of disk drives.

17. The system of claim 12 wherein at least part of said means for detecting underperformance of disk drives is comprised in said control layer.

18. The system of claim 12 further configured to estimate a value characterizing expected performance degradation of a given disk drive and to detect underperformance of said disk drive if said estimated value matches a certain underperformance criteria.

19. The system of claim 18 wherein READ ERROR RATE and/or SEEK ERROR RATE are used as parameters indicative of expected performance degradation for SMART-enabled disk drives.

20. The system of claim 19 wherein a rate of variation of values of READ ERROR RATE and/or SEEK ERROR RATE is used as said estimated value characterizing expected performance degradation.

21. The system of claim 20 wherein said rate of variation is calculated in relation with a certain rate measuring threshold.

22. A method of operating a mass storage system comprising a storage layer operatively coupled to a plurality of disk drives constituting a storage space, the system configured to enable direct or indirect serving a request directed to any accessible address in the storage space, the method comprising:
   a. dividing the storage space into an available storage space configured to be available to a client and a spare storage space configured to be unavailable to a client;
   b. distributing the available space and the spare space over the plurality of disk drives thus giving rise to available space and spare space allocated to each given disk drive;
   c. detecting underperformance of at least one disk drive among the plurality of disk drives;
   d. responsive to detecting underperformance, decreasing respective available space allocated to said at least one underperforming disk drive and respectively increasing spare space allocated to said at least one underperforming disk drive thus giving rise to a re-configured allocation of the available space; wherein the amount of increased spare space allocated to said at least one underperforming disk drive is predefined as a function of at least one parameter selected from a group comprising:
      i. a number of currently underperforming disk drives among the plurality of disk drives;
      ii. a number of underperforming disk drives among the plurality of disk drives detected during a certain period of time;
      iii. a rate of deviation of the detected level of underperformance from the current average performance of the plurality of the disk drives; and
      iv. a rate of deviation of the detected level of underperformance from the average performance of the plurality of the disk drives in the system over a certain period of time; and
   e. transferring the stored data in accordance with said re-configured allocation of the available space.

23. A mass storage system comprising:
   a. a plurality of disk drives constituting a storage space, wherein:
      i. the system configured to enable direct or indirect serving a request directed to any accessible address in the storage space;
      ii. the storage space is divided into an available storage space configured to be available to a client and a spare storage space configured to be unavailable to a client;
      iii. the available space and the spare space are distributed over the plurality of disk drives thus giving rise to available space and spare space allocated to each given disk drive;
   b. means for detecting underperformance of at least one disk drive among the plurality of disk drives;
   c. a control layer operatively coupled to the plurality of disk drives and configured:

i. responsive to detecting underperformance, to decrease respective available space allocated to said at least one underperforming disk drive and respectively increase spare space allocated to said at least one underperforming disk drive thus giving rise to a re-configured allocation of the available space; wherein the amount of increased spare space allocated to said at least one underperforming disk drive is predefined as a function of at least one parameter selected from a group comprising: a number of currently underperforming disk drives among the plurality of disk drives; a number of underperforming disk drives among the plurality of disk drives detected during a certain period of time; a rate of deviation of the detected level of underperformance from the current average performance of the plurality of the disk drives; and a rate of deviation of the detected level of underperformance from the average performance of the plurality of the disk drives in the system over a certain period of time; and ii. facilitate transferring the stored data in accordance with said re-configured allocation of the available space.

\* \* \* \* \*